United States Patent [19]

Bierend

[11] Patent Number: 5,031,082
[45] Date of Patent: Jul. 9, 1991

[54] REMOTELY CONTROLLED SECURITY LIGHTING

[76] Inventor: Gary D. Bierend, 30405 Jasmine Valley Dr., Canyon Country, Calif. 91351

[21] Appl. No.: 582,927

[22] PCT Filed: Nov. 27, 1989

[86] PCT No.: PCT/US89/05265
§ 371 Date: Oct. 5, 1990
§ 102(e) Date: Oct. 5, 1990

[51] Int. Cl.⁵ .............................................. F21M 7/00
[52] U.S. Cl. .................... 362/233; 362/272; 362/286; 340/310 R; 340/310 A; 340/538
[58] Field of Search ............... 362/233, 271, 272, 276, 362/286, 295, 386, 802; 340/310 R, 310 A, 318, 332, 538

[56] References Cited

U.S. PATENT DOCUMENTS

| | | | |
|---|---|---|---|
| 3,049,615 | 8/1962 | Sawyer | 362/272 X |
| 3,644,728 | 2/1972 | Hessemer et al. | 362/212 |
| 3,942,168 | 3/1976 | Whyte | 340/310 R |
| 3,942,170 | 3/1976 | Whyte | 340/310 A |
| 4,598,345 | 7/1986 | Kleeman | 362/233 |
| 4,712,167 | 12/1987 | Gordin et al. | 362/233 |
| 4,779,168 | 10/1988 | Montgomery | 362/233 X |

Primary Examiner—Stephen F. Husar
Attorney, Agent, or Firm—Albert O. Cota

[57] ABSTRACT

A remotely controlled security lighting system (10) that utilizes the common utility power lines of a building to provide communication between a master control/transmitting unit (12) and a plurality of remote light-/receiving units (50). The unit (12) includes a light selector switch (16) that allows a particular light to be selected, a light power switch (18) that powers the selected light and a joystick (20) that positions the selected light in azimuth and elevation. The remote light-/receiving unit (50) includes azimuth and elevation motors (64)(68) that are mechanically linked to the light (72), and a light power controller (70) that applies power to the light. In a typical situation, a remote light-/receiving unit (50) would be attached to each upper corner of a structure and each unit (50) would be connected to the utility power line. The master control/transmitting unit (12) is then plugged into any utility power receptacle in any room; and by means of the switches (16)(18) and the joystick (20) any of the remote lights (72) can be selected, turned on and positioned.

24 Claims, 4 Drawing Sheets

REMOTELY CONTROLLED SECURITY LIGHTING

TECHNICAL FIELD

The invention pertains to the general field of security lights and more particularly to a plurality of remote light/receiving units that are attached to a structure, such as a home or building, and that are positionably controlled by a master control/transmitting unit that communicates with the light unit via the structure's utility power lines.

BACKGROUND ART

Many structures, such as homes and most commercial buildings include some type of device to discourage burglaries and intrusions. Devices currently in use include alarms that are activated by various types of sensing elements, surveillance television cameras and various types of fixed and/or movable lights. The light arrangement most often used utilizes lights that are attached to the structure in a fixed position and are wired directly to a master control unit that allows the lights to be turned on or off. In this particular lighting arrangement, unless a relatively large quantity of lights are used, it is possible for an intruder to avoid the lights fixed area of illumination and enter an area undetected.

To completely illuminate a large area, it is necessary to employ several individual lights that are carefully arranged to cover the entire area with some degree of uniformity. At best, it is possible only to approach such a condition and a large quantity of lights are required to do the job. This arrangement involves a substantial expenditure of money both in equipment and in the electricity required to operate the lamps.

In some locations, surveillance lights are used that have a preset angular displacement and timed rotation. That is, the azimuth and elevation positioning angle and the light rotation time are fixed. In this type of set-up, there is very little flexibility allowed to make significant changes to the lights angular positions and travel. Therefore, it is possible for an intruder to time the light rotation and again avoid detection.

A search of the prior art did not disclose any patents that provided the ease of attachment, control and flexibility of the instant invention. The prior art patents also did not read directly on the claims of the instant invention, however, the following United States patents were considered related:

| PATENT NO. | INVENTOR | ISSUED |
| --- | --- | --- |
| 4,779,168 | Montgomery | 18 October 1988 |
| 4,598,345 | Kleeman | 1 July 1986 |
| 3,644,728 | Hessemer et al | 22 February 1972 |
| 3,049,615 | Sawyer | 14 August 1962 |

The Montgomery patent discloses a movable light system that is attached to a land vehicle. The system includes a plurality of lights which are mounted in various locations on the vehicle. Each light includes an adjustment mechanism that allows the rotative and annular position of the light to be adjusted. The adjustments are made via a controller mechanism attached within the passenger compartment of the vehicle. The controller operates lights through the use of electrical conductors powered by the vehicle battery. Alternatively, the lights may be operated and controlled from outside the vehicle by the use of a wireless transmission from transmitters housed in the controller mechanism to individual receivers mounted on each light control.

The Kleeman patent discloses a radio-controlled, remotely operated television or movie studio spotlight. The spotlight may be panned, tilted and dimmed by moving two joysticks that cause the transmission of signals from a radio transmitter to a corresponding radio receiver. From the receiver discrete commands are channeled to the particular function execution(s) by means of servomotors. The spotlight is designed to operate from a conventional electric wall outlet or from batteries.

The Hessemer et al patent discloses a lamp that is controlled from a remote location utilizing a pair of reversible motors mounted within the lamp housing. The lamp may be pivoted about both the horizontal and vertical axis by energizing the motors.

The Sawyer patent discloses a single light unit that is adapted to illuminate a large area of ground. The light includes the means for moving the light in cycles through a fixed path at a high rate of speed. The speed is such that the elapsed time per cycle is in the order of the light retention time of the normal human eye. As a result, the entire area covered by the fixed path is flooded with light. Although, the illumination of any part of the path is intermittent, the speed of the lamp prevents flicker or interruption in the illumination apparent to the eye.

DISCLOSURE OF THE INVENTION

The remotely controlled security lighting system is designed to be used in structures, such as homes and commercial buildings to provide a selectable and controllable area of light illumination. The system is comprised of two units, a single master control/transmitting unit and at least one and preferably four to six remote light/receiving units.

The master control/transmitting unit includes a light selector switch that selects the particular light that will be controlled, a light power switch that applies power to the selected light and to all the lights in an emergency or panic situation, and a joystick that allows the selected light to be positioned in azimuth and elevation. The unit also includes a transmitter electronics module that receives and processes the signals produced by the two switches and the joystick.

The remote light/receiving unit is designed to be mounted to a structure. Each receiving unit includes a receiver electronics module that receives and processes the signals applied from the master control/transmitting unit. The processed signals are used to turn-on the light and to energize an azimuth and an elevation motor that are mechanically linked to the light. The motors cause the lights to be selectively positioned, as commanded by the joystick, in azimuth (right-left) or elevation (up-down). The light positioning limits are designed to provide the required light-arc to cover a wide area of illumination.

One of the design parameters of the system is that the master control/transmitter unit be operated from any room of a house or commercial building that has a standard utility power receptacle. The remote light/receiving unit is likewise designed to be connected to a utility power receptacle that shares the same utility power line system. Thus, when the two units are independently connected to utility power receptacles, the communication media between the two units is provided by the utility power lines.

In view of the above disclosure, it is the primary object of the invention to have a master control/transmitter unit that allows a light, located on a remote light/receiving unit, to be turned on and remotely positioned. Additionally, the primary object extends to having the communication media between the two units be the shared utility power line.

In addition to the above object, it is also an object of the invention to have a remotely controlled security lighting system that:
- can replace any existing outdoor security light systems,
- allows a single master control/transmitting unit to operate a plurality of remote light/ receiving units,
- allows the remote light/receiving unit to be mounted outdoors or indoors such as in a large warehouse area,
- allows the remote light to be adjusted to provide a large scan arc to cover areas that are not usually covered by fixed lights,
- is easily installed and, with the exception of changing light bulbs, is relatively maintenance free,
- can be used in a photographic or a motion picture/television studio to provide adjustable set lighting,
- allows a single adjustable light to replace a plurality of fixed lights,
- can have the remote light mounted on a tripod or pole to provide adjustable lighting in a work site,
- has a high reliability, and
- is cost effective in both manufacturing and consumer costs.

BEST MODE FOR CARRYING OUT THE INVENTION

Figure 1:
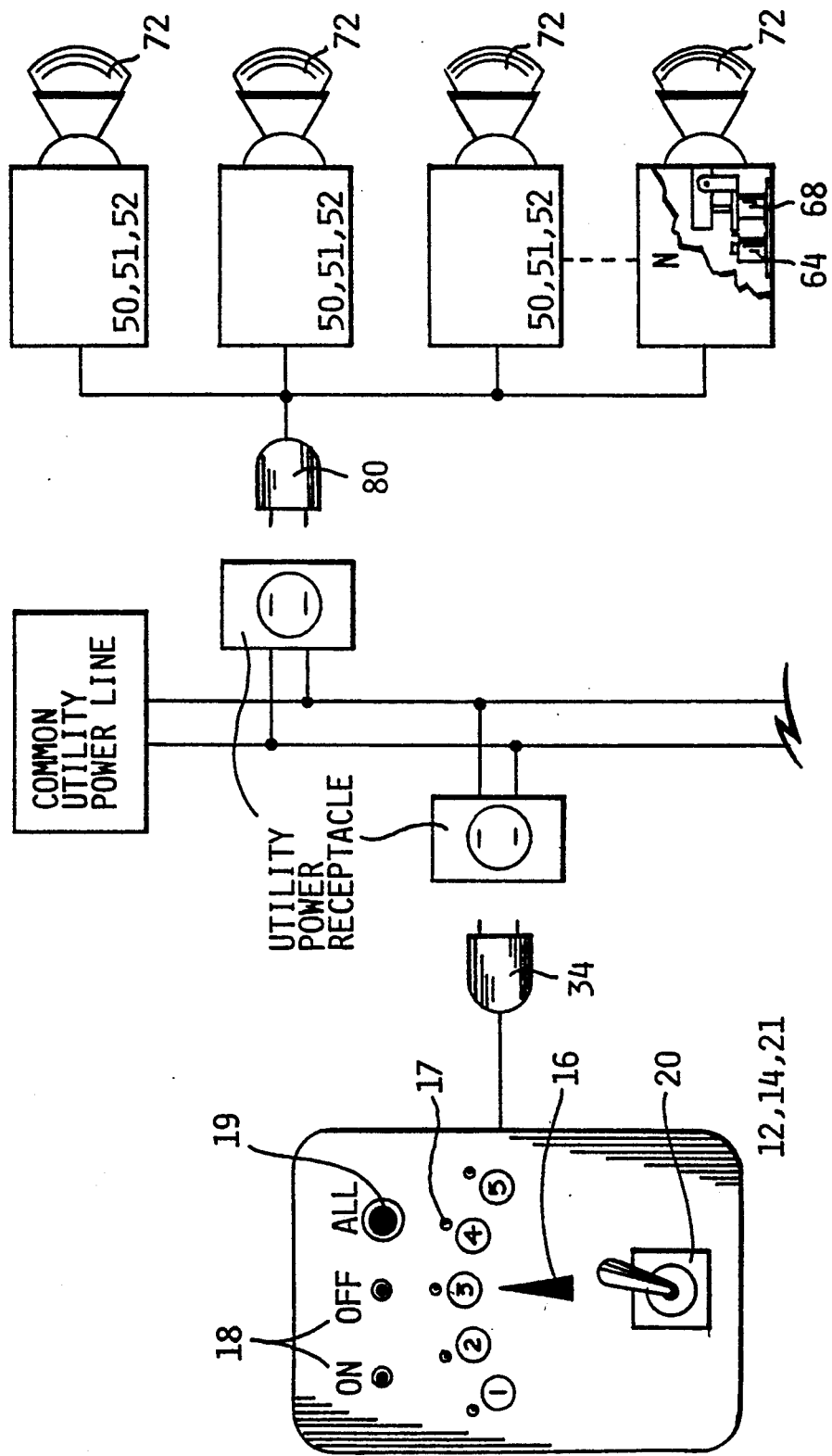
FIG. 1 is a block diagram illustrating a master control/transmitting unit connected to a plurality of remote light/receiving units via shared utility power lines located within a structure such as a home.

The best mode for carrying out the invention is presented in terms of a preferred embodiment that is designed to use the utility power lines within a structure as the communication media between a master control/transmitting unit, operated within the structure, and at least one remote light/receiving units attached externally to the structure.

The preferred embodiment of the remotely controlled security lighting system 10, as shown in FIGS. 1-4 is comprised of two units: a master control/transmitting unit 12 and a remote light/receiving unit 50. The master control/transmitting unit 12 is further comprised of the following major elements: a first enclosure 14, a light selector switch 16, a light power switch 18, a joystick 20, a transmitter electronics module 21 consisting of an encoder 22, a first universal asynchronous receiver/ transmitter (first UART) 24, a first power line modem 26, and a first power line interface 28; the unit 12 also includes a first frequency selection switch 30 and a first power supply 32.

The remote light/receiving unit 50 is further comprised of the following major elements: a weather resistant enclosure 51, a receiver electronics module 52 consisting of a second power line interface 54, a second power line modem 56, a second universal asynchronous receiver/transmitter (second UART) 58, and a decoder 60; the unit 50 also includes an azimuth motor controller 62, an azimuth motor 64, an elevation motor controller 66, an elevation motor 68, a light power controller 70, a light 72, a second frequency selection switch 74, a light identification switch 76 and a second power supply 78.

Figure 3:
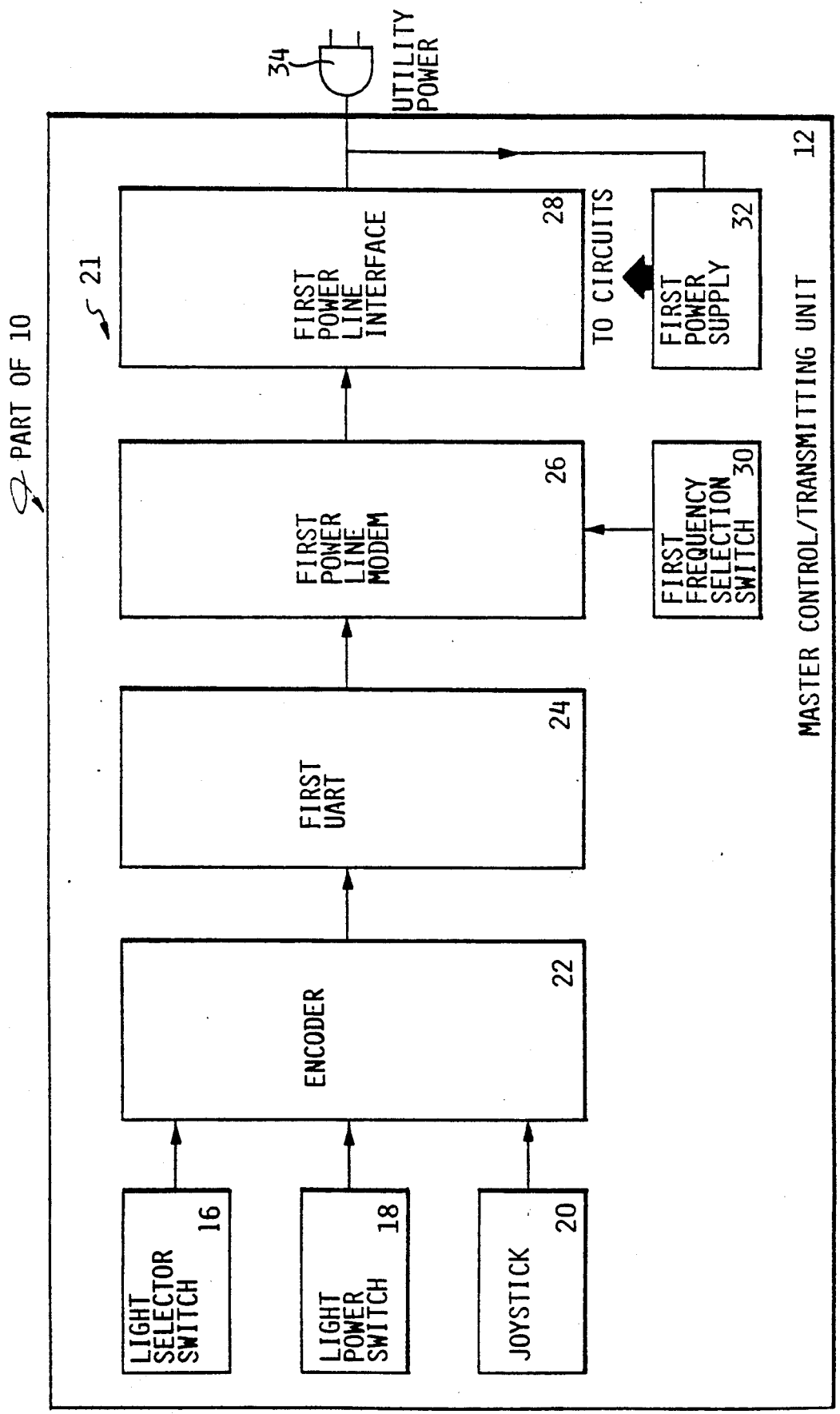
FIG. 3 is a block diagram of the master control/transmitting unit.

The master control/transmitting unit 12, as shown in FIGS. 1 and 3 is housed in the first enclosure 14 that may be constructed of aluminum or a plastic material. On one of the external surfaces of the enclosure, as shown in FIG. 1, is accessibly located the light selector switch 16, the light power switch 18 and the joystick 20. The light selector switch 16 provides the means by which a specific light is selected. Preferably this switch consists of a multi-position switch which in the preferred embodiment has four positions with each position having a number that corresponds with a specific light 72. Optionally, each position may include a light emitting diode (LED) 17 that illuminates to visually indicate the light that was selected by the switch 16. At each switch position a light identification signal is produced that corresponds to the specific light and light location.

The switch 16 as well as the light power switch 18 and joystick 20 all function by means of a binary code controlled by a combination of an electrical ground and a voltage supplied by the first power supply 32. For example, the light selector switch 16 and joystick 20 operate with a 3-bit binary code that allows eight positions (0-7) to be controlled. The binary coded outputs are applied to the encoder 22 where they are encoded into an 8-bit digital code for further processing. Compatible TTL or CMOS logic or other logic schemes may be used.

The means for applying power to the light is controlled by the light power switch 18. When this switch is placed in the "ON" position, a binary coded light-on signal is produced. The signal is subsequently applied to the light power controller 70 which then allows the specific light 72 selected by the light selector switch 16 to illuminate. The master control/ transmitter, unit may also include a master power switch 19 as shown in FIG. 1, that is electrically connected to allow all of the lights 72 to turn-on simultaneously when the switch 19 is placed in the ON position. This switch would be activated primarily during an emergency/ panic situation. The switches 18 and 19 include circuitry so that the light selected for control by the light selection switch 19 is activated.

Additionally, a combination light selector/power switch (not shown) can also be incorporated and used in lieu of the light selector switch 16 and light power switch 18.

The position of the light is controlled by a positioning means that produces a set of positioning signals that allows the light 72 to be moved independently through azimuth and elevation angles. The positioning means can include a series of individual switches, a conductive ball rolling on a conductive surface or preferably the joystick 20. When the joystick is positionally displaced, it produces a set of light positioning signals that control the physical position of the specific light 72 selected by the light selector switch 16. The joystick may be configured with a four-position switch or an eight-position switch. The four position switch allows the light 72 via the azimuth and elevations motors 64, 68 to be moved up, down, right or left. The eight position switch also allows the above positions as well as intermediate positions between up and right, right and down, down and left or left and up.

The binary coded signals produced by the light selector switch 16, light power switch 18 and joystick 20 are inputted to the encoder 22 which comprises one of the elements of the electronics module 21. The encoder 22 has the means to receive and encode the binary coded signals into an 8-bit digital code. From the encoder, the encoded signals are applied to a first universal asynchronous receiver/transmitter (first UART) 24 having the means to receive and convert the binary coded signal from the encoder into a digital serial data format. This format consists of an 8-bit code with the addition of a parity bid to check data validity and "start" and "stop" bits that are used by the remote light/receiving unit to synchronize the data. As an alternate design consideration, the encoder 22 and first UART 24 could be eliminated and their functions accomplished by a microprocessor (not shown).

The output from the first UART 24 is applied to the first power line modem 26. The modem has the means to receive and convert the UART's serial data format into a modulated signal indicative of the corresponding signal from the switches 16, 18 or joystick 20. The modulated signal more specifically consists of an Amplified Shift Key (ASK) carrier on/off modulated signal. When the signal transmits a "1" bit, the modem 26 outputs the carrier frequency; when an "0" bit is transmitted, the modem 26 turns off and sends no signal for that time period.

In the preferred embodiment, a first frequency selection switch 30 is connected to the first power line modem 26. The switch 30 is positioned to select one of a plurality of operational frequencies in which the master control/transmitter unit 12 may operate. The frequency is selected to prevent interference from similar units that may be operating within an interference range of the unit 12.

Figure 2:
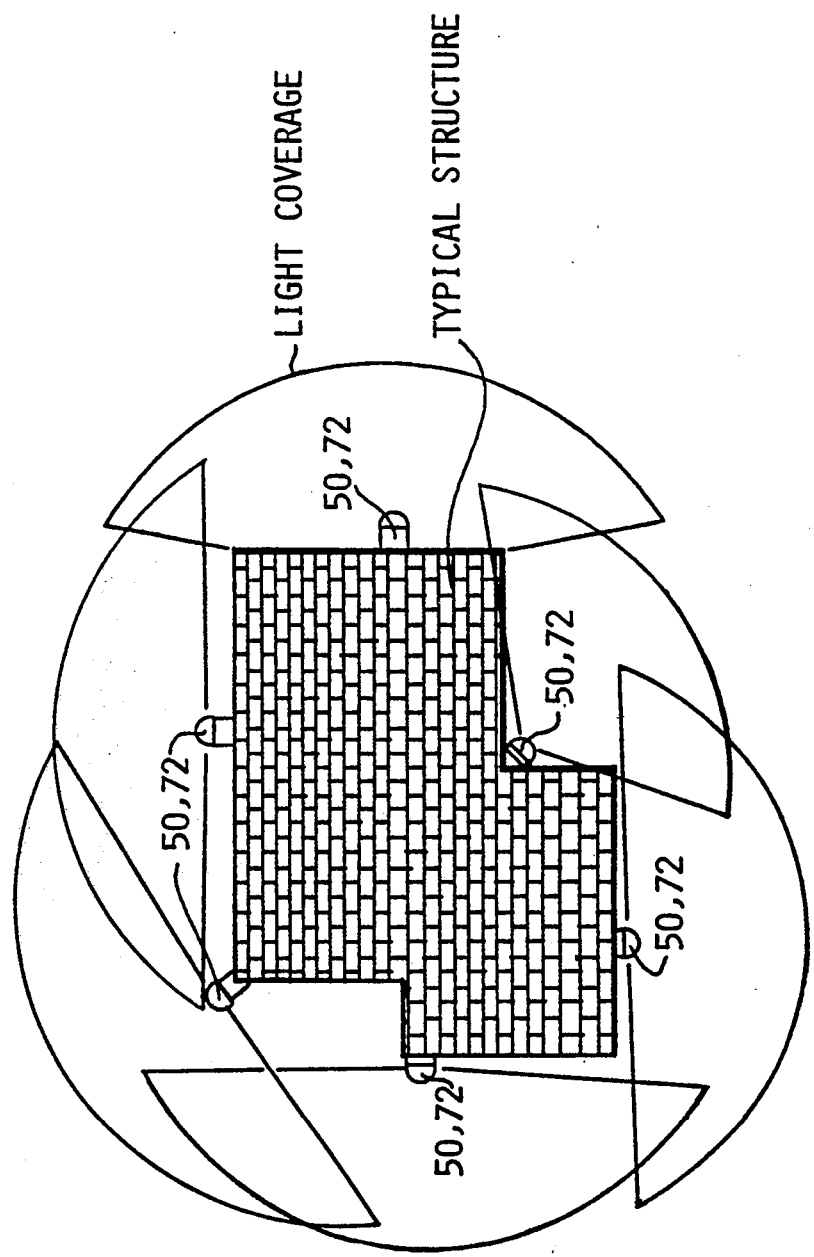
FIG. 2 is a top view of a home showing a typical placement of several remote light/receiving units and the lighting coverage that can be provided by the units.

One of the features inherent in the remotely controlled security lighting system 10 is the ability for the master control/transmitting unit 12 and remote light/receiving unit to communicate with each other by means of the existing utility power lines. This connection media allows the unit 12 to be operated from any room in a structure that has a standard utility power receptacle. For example, a bedroom or the kitchen of a dwelling, from a control booth of a large warehouse, or from a building physically separated from the main dwelling. The only requirement to allowing a single master control/transmitting unit to operate a plurality of remote lights/receiving units, regardless of where they are physically located, is that the two units be operated from a common utility power line; that is, a power line that is derived from a common utility power transformer. The unit 50 or a plurality of units 50 can likewise be attached to a structure, such as the roof or eaves of a building and easily connected by means of the second utility power connector 80 to the same utility power line system. To add further utility to the invention, the lights may be operated in combination with a dimmer, an alarm system or with a surveillance television camera. A typical structure light placement and light coverage provided by a plurality of lights 72 is shown in FIG. 2.

The power to operate the master control/transmitting unit 12 is provided by a first power supply 32 having the means to provide the required power levels to operate the circuits of the unit 12. In the preferred embodiment, the first power supply 32 converts the utility power a-c voltage to a d-c voltage as shown in FIG. 3.

Figure 4:
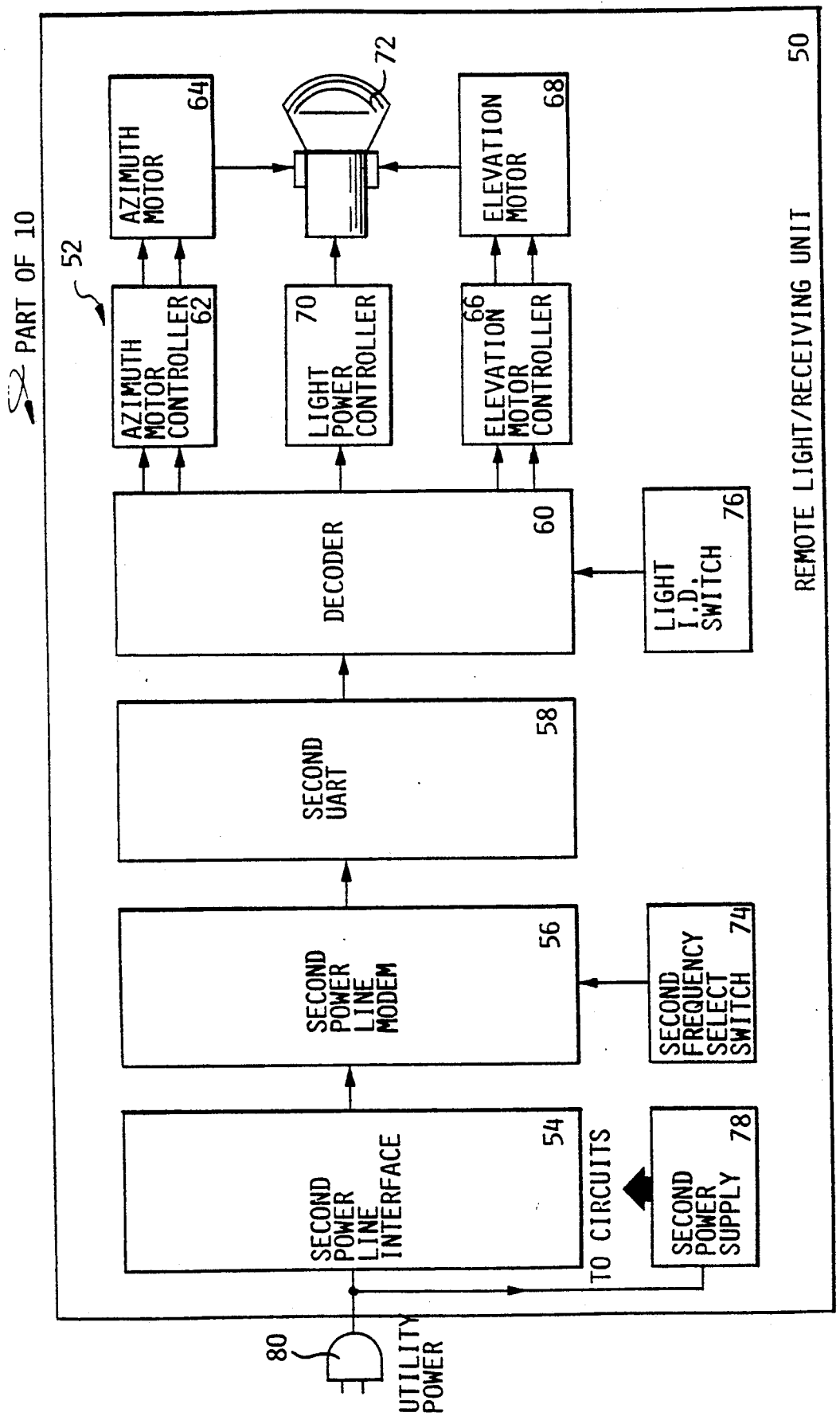
FIG. 4 is a block diagram of the remote light/receiving unit.

The remote light/receiving unit 50 as shown in FIGS. 1 and 4, is housed in a weather resistant enclosure 51 that includes provision to allow the light 72, as shown in FIG. 1, to move freely about its azimuth and elevation axis. The lights 72 may be high intensity incandescent lights or preferably quartz-halogen lights.

The input to the unit 50 is applied through the second utility power connector 80 to the second power line interface 54 which is the first of seven elements that comprise the receiver electronics module 52. The interface 54 has the means to receive and process the modulated signal applied from the first power line interface 28 via the structure's utility power line as previously described. The interface 54 also has the means to allow the received signal to be coupled from the utility power line to the second power line modem 56 while maintaining isolation. Thus, any relatively high voltage present in the power lines cannot enter and damage the electronics circuits in the remote light/ receiving unit.

The second power line modem 56 has the means to receive and convert the modulated signal from the second power line interface 54 back into a digital serial data format. As in the master control/transmitting unit 12, the modem 56 also has connected a second frequency selection switch 74. This switch is set at the same operational frequency that is set at the first frequency selection switch 30. The frequency, as before, is selected to prevent interference from similar units operating within the interference range of the remote light/receiving unit 50.

The output of the second modem 56 is applied to the second universal asynchronous receiver and transmitter (second UART) 58. The second UART has the means to receive and process the serial data format from the second modem 56 and perform the following functions:
  (a) uses the "stop" bits to synchronize the received data to allow the coded information to be retrieved,
  (b) deletes the original 8-bit code out of the serial data format and converts it back to an 8-bit parallel digital code,
  (c) examines the parity bit and determines data validity,
  (d) performs other ancillary tasks to insure good data reception.

The output of the second UART 58 is applied to the decoder 60 that has the means to receive and convert the 8-bit parallel digital codes to the following individual light control signals:
  (a) azimuth motor - right,
  (b) azimuth motor - left,
  (c) elevation motor - up,
  (d) elevation motor - down,
  (e) light on or off.

The azimuth motor 64 and elevation motor 68, as shown in FIGS. 1 and 3, are mechanically linked to drive and position the light 72. The design of the mechanical linkage and drive mechanism is not described or shown since several designs, well known in the art, may be used to perform this function. The motors are bidirectional geared motors that may be selected to operate from either a d-c or a-c voltage.

The azimuth motor 64 is controlled by the azimuth motor controller 62 that comprises a switching means, such as a relay, Triac or SCR's (not shown), to control the application of power to the azimuth motor 64 along with the right or left directional signals as received from the decoder 60. Likewise, the elevation motor is controlled by the elevation motor controller 66 that also comprises a similar switching means to control the application of power to the elevation motor 68 along with the up or down directional signals as received from the decoder 60.

The light power controller 70, as shown in FIG. 4, comprises a similar switching means to control the application of power to the light 72. The power is applied when the light on or off signal is received from the decoder 60. Connected to the decoder 60 is a multiposition light identification switch 76. The switch is set to a light identification position that corresponds to the light selection position set at the light selector switch 16. The setting is made only once during the installation of the remote light/receiving unit 50.

The final element described for the system 10 is the second power supply 78. This power supply, as with the first, has the means to provide the required power levels to operate the circuits of the remote light/ receiving unit 50. In the preferred embodiment, the second power supply 78 converts the utility power a-c voltage to a d-c voltage as shown in FIG. 4.

While the invention has been described in complete detail and pictorially shown in the accompanying drawings, it is not to be limited to such details, since many changes and modifications may be made to the invention without departing from the spirit and the scope thereof. For example, in lieu of a combination utility power connector and receptacle, the remote light-/receiving unit can be hard wired into an electrical J-box. Hence, it is described to cover any and all modifications and forms which may come within the language and scope of the claims.

I claim:

1. A remotely controlled security lighting system comprised of a master control/transmitting unit and at least one remote light/receiving unit:
   A. said master control/transmitting unit comprising:
      (1) means for selecting a specific light and providing a light identification signal corresponding to said light selected,
      (2) means for controlling the power applied to said light and providing a light-on signal corresponding to said light selected,
      (3) means for controlling the position of the selected said light and providing a set of light positioning signals,
      (4) a transmitter electronics module having the means for receiving and processing the light identification signal, light-on signal and set of light positioning signals, where the processed signals are applied to a standard first utility power connector from where the signals are communicated via the utility power lines, to a standard second utility power connector from where the signals are applied to said remote light/receiving unit,
   B. said remote light/receiving unit comprising:
      (1) an elevation motor mechanically linked to drive said light,
      (2) an azimuth motor mechanically linked to drive said light,
      (3) a receiver electronics module having the means to be connected to the second standard utility power receptacle from where the signals from said master control/transmitting unit are received and processed to subsequently produce:
         (a) a set of power and directional signals that are applied to and control the position of said light via said elevation and azimuth motors and
         (b) a light on or off signal that controls the application of power to said light.

2. The system as specified in claim 1 wherein said means for controlling the position of said light is accomplished by a joystick.

3. A remotely controlled security lighting system comprised of a master control/transmitting unit and at least one remote light/receiving unit:
   A. said master control/transmitting unit comprising:
      (1) a multi-position light selector switch where at each switch position a light identification signal is produced that corresponds to a specific said light and light location,
      (2) a light power switch where when said switch is placed in the "on" position, a light-on signal is produced that subsequently causes the specific said light selected by said light selector switch to illuminate,
      (3) a joystick that when positionally displaced placed produces a set of light positioning signals that control the physical position of said specific light selected by said light selector switch,
      (4) an encoder having the means to receive and encode the input signals from said light selector switch, said light power switch and said joystick into a binary coded signal,
      (5) a first universal asynchronous receiver/ transmitter (first UART) having the means to receive and convert the binary coded signal from said encoder into a digital serial data format,
      (6) a first power line modem having the means to receive and convert the serial data format from said first UART into a modulated signal,
      (7) a first power line interface having the means to receive, process and apply the modulated signal to a standard first utility power connector from where the signals are communicated via the utility power lines to a remote standard second utility power connector from where the signals are applied to said remote light/receiving unit,
      (8) a first power supply having the means to provide the required power levels to operate the circuits of said master control/transmitting unit,
   B. said remote light/receiving unit comprising:
      (1) a second power line interface having the means to receive and process the modulated signal from said first power line interface via the structure electrical wiring,
      (2) a power line modem having the means to receive and convert the modulated signal from the second power line interface back into a digital serial data format,
      (3) a second universal asynchronous receiver and transmitter (second UART) having the means to receive and process the serial data format from said second power line modem and perform the following functions:

(a) uses the "start" and "stop" bits to synchronize the received data to allow the coded information to be retrieved,
(b) deletes the original 8-bit code out of the serial data format and converts it back to an 8-bit parallel digital code,
(c) examines the parity bit and determines data validity,
(d) performs other ancillary tasks to insure good data reception,
(4) a decoder having the means to receive and convert the 8-bit parallel digital codes from said second UART to the following individual light control signals:
(a) azimuth motor - right,
(b) azimuth motor - left,
(c) elevation motor - up,
(d) elevation motor - down,
(e) light on or off,
(5) an azimuth motor mechanically linked to drive said light,
(6) an elevation motor mechanically linked to drive said light,
(7) an azimuth motor controller that comprises a switching means to control the application of power to said azimuth motor along with the right or left directional signals as received from said decoder,
(8) an elevation motor controller that comprises a switching means to control the application of power to said elevation motor along with the up or down directional signals as received from said decoder,
(9) a light power controller that comprises a switching means to control the application of power to said light when the light on or off signal is received from said decoder, and
(10) a second power supply having the means to provide the required power levels to operate the circuits of said remote light/receiving unit.

4. The system as specified in claim 3 wherein said master control/transmitting unit further comprises a master power switch that is electrically connected to allow all said lights to turn-on simultaneously when said master power switch is placed in the "on" position.

5. The system as specified in claim 3 wherein said master control/transmitting unit further comprises a light emitting diode (LED) placed adjacent to each of the switch positions of said light selector switch where an illuminating said LED identifies the specific light that has been selected for operation.

6. The system as specified in claims 2 or 3 wherein said joystick is comprised of a four-position switch that allows said light, via said azimuth and elevation motors, to be moved up, down, right or left.

7. The system as specified in claims 2 or 3 wherein said joystick is comprised of an eight-position switch that allows said light, via said azimuth and elevational motors, to be moved up, down, right or left as well as to intermediate positions between up and right, right and down, down and left and left and up.

8. The system as specified in claim 3 further comprising a combination light selector/power switch that combines the functions provided by said light selector switch and said light power switch.

9. The system as specified in claim 3 wherein said first UART serial data format consists of an 8-bit code with the addition of a parity bid to check data validity and "start" and "stop" bits that are used by said remote light/receiving unit to synchronize the data.

10. The system as specified in claim 3 wherein the modulated signal produced by said first power line modem consists of an amplified shift key (ASK) carrier on/off modulated signal.

11. The system as specified in claim 10 wherein when the ASK carrier on/off modulated signal transmits a "1" bit, said modem outputs the carrier frequency and when an "0" bit is transmitted said modem turns off and sends no signal.

12. The system as specified in claim 3 wherein said first power line interface has the means to provide isolation between said first power line modem and the utility power lines so that any relatively high voltage present in the utility power lines cannot feed back and damage the electronic circuits in said master control/ transmitting unit.

13. The system as specified in claim 3 wherein said first power supply converts the utility power a-c voltage to a d-c voltage suitable to operate the circuits of said control/transmitting unit.

14. The system as specified in claim 3 further comprising a first frequency selection switch connected to said first power line modem, where said switch selects the operational frequency of said master control/transmitting unit, where the frequency is selected to prevent interference from similar units operating within an interference range of said unit.

15. The system as specified in claim 3 wherein said second power line interface comprises circuit means that allows the signal received from said first power line interface via the utility power lines to be coupled from the power lines to said second power line modem, while maintaining isolation so that any relatively high voltage present in the power lines cannot enter and damage the electronics circuits in said remote light/receiving unit.

16. The system as specified in claim 3 further comprising a second frequency selection switch connected to said second power line modem, where said switch selects the same operational frequency that is set at said first frequency selection switch and where the frequency is selected to prevent interference from similar units operating within an interference range of said remote light/receiving unit.

17. The system as specified in claim 3 further comprising a multi-position light identification switch connected to said decoder, where each said light identification switch position corresponds to the light selection position set at said light selector switch.

18. The system as specified in claim 3 wherein said power switching means of said azimuth and elevation motor controllers and said light controller comprises a relay.

19. The system as specified in claims 1 or 3 wherein said azimuth and elevation motors are bidirectional geared motors that operate on d-c power.

20. The system as specified in claims 1 or 3 wherein said azimuth and elevational motors are bidirectional geared motors that operate on a-c power.

21. The system as specified in claims 1 or 3 wherein said light is comprised of a high intensity incandescent light.

22. The system as specified in claims 1 or 3 wherein said light is comprised of a quartz-halogen light 23. The system as specified in claims 1 or 3 wherein said remote light/receiving unit is housed in a weather resistant enclosure that includes provisions to allow the light to move freely about its azimuth and elevation axis.

24. The system as specified in claims 1 or 3 wherein a plurality of remote light/receiving units can be located on buildings that are physically separated and be operated from a single said master control/transmitting unit as long as both said units are connected to a common utility power line.

* * * * *